Patented May 29, 1945

2,377,082

UNITED STATES PATENT OFFICE 2,377,082

GEOCHEMICAL PROSPECTING

Bela Hubbard, Mount Vernon, N. Y., assignor to Standard Oil Development Company, a corporation of Delaware No Drawing. Application March 31, 1942, Serial No. 436,966

3 Claims. (Cl. 23—230)

This invention relates to a method of prospecting for subterranean petroleum deposits by searching for solid petroleum derivatives in the soil or other formations at or near the earth's surface, and to a method for the identification of crude oils for purposes of geological correlation.

Seepages to the earth's surface of petroleum and other naturally occurring hydrocarbons have long been known and recognized as indications of buried pools of oil or gas, portions of which have escaped by leakage to the surface. It has also long been known that such surface seepages of oil and gas may often occur in such small quantity that their presence in the soil or at the surface is difficult to detect, and may easily escape observation. Various methods and means for detecting such minute traces of hydrocarbons in the soil have been devised, and are well known to the art of geochemical prospecting. Most of these methods are quantitative, in that they provide means for determining the relative concentration of the hydrocarbon (or hydrocarbons) in the soil samples collected at spaced stations throughout the area prospected. The areas of high hydrocarbon concentration in the samples are the areas most indicative of buried oil or gas pools. Some of these methods are also qualitative, in that they endeavor to separate and identify the various groups of hydrocarbons in the soil, such as methane, ethane and heavier gases, liquid hydrocarbons, soil-wax, etc. Such methods are therefore both quantitative and qualitative, in that they not only identify the hydrocarbon (as for example, methane) but give a quantitative measure of its concentration in the soil sample.

It is the purpose of the present invention to afford means for distinguishing a soil wax of petroleum origin from all the other soil waxes which owe their origin to chemical or bio-chemical processes taking place in the soil or which may have derived from the excretions of plants or insects.

I have found that petroleum waxes may be positively identified as such by their crystalline characters, provided that a proper technique is used in preparing the wax for petrographic examination. I have found that, when this technique is used, and the wax crystals are formed from a super-saturated solution in C. P. toluene at 70° F., all petroleum waxes of sufficiently high melting point invariably yield crystals which are simple or modified rhombic plates or tablets belonging to the orthorhombic system, and optically positive. I have found that whereas all petroleum waxes, capable of crystallization under these conditions, are of the above description, they vary in size, sharpness of edges, index of refraction, twinning, and in other physical and optical characteristics, depending on the crude oil from which the wax was extracted. I have further discovered that whereas various minor characteristics of these petroleum wax crystals vary with the parent crude oil, all wax crystals obtained from petroleum can readily be distinguished from waxes of non-petroleum origin, such as beeswax, for example. I have found that these waxes of non-petroleum origin, when subjected to identically the same treatment, are either non-crystalline (amorphous) at normal air temperatures, such as 70° F., or, if crystalline, show crystalline characteristics entirely different than those of the petroleum waxes. The non-petroleum wax crystals are commonly needle-like in form and of very small to sub-microscopic size. When large enough to afford detailed study, I have found the crystals of non-petroleum origin to belong to the monoclinic and possibly other systems. In no case have I found them sufficiently large in size or similar in shape to be confused with the petroleum wax crystals.

It is well known that the normal and stable form of the wax crystal is the needle form. It is also well known that when petroleum wax cools below its melting point, or commences to crystallize from a super saturated solution, the earliest crystal form is normally that of plates or tablets. It is also known that these plates soon begin to curl or roll up along the margins until each plate is changed to one or more needle-like forms. Once the needle form of crystallization has been reached, it is no longer possible to study the crystallographic characters of the wax, since the needle-like crystals of one wax are not usually distinguishable from those of any other wax. The problem, therefore, is to devise a technique by means of which crystallization of the wax can be permanently arrested in the initial stages as plates, tablets, or otherwise as normal crystals, and prevented from rolling or curling into long needles.

A great deal of work has been done during the past twenty-five years on the microscopic study of petroleum wax crystals, but this work has been directed primarily to the wax needles with a view to determine the effect of crystalline structure on the viscosity of lubricating oils, and similar problems. These studies have often been carried out by inducing wax crystallization from super-saturated solutions in such solvents as naphtha, benzene, alcohols, carbon tetrachloride, and many others.

The various methods of extracting wax from crude petroleum and other substances containing wax are well known and are not a part of this invention. It is merely necessary to point out that the use of my technique for preparing suitable wax crystals does not always or necessarily require pure or refined wax material. It is well known that petroleum jelly, asphalt, and many other oily materials, when present in quantity with the wax, act as inhibitors to the growth of wax crystals. This being true, it is essential that the wax sample to be used be reasonably free of such contaminating substances. This purification can be accomplished by the use of acetone, or any one of a number of methods known to the art. I have found, however, that wax residues, even when deeply colored with asphaltic or other oily material, can usually be successfully crystallized with my technique.

In experimenting with these and other wax solvents using samples of the same petroleum wax in each series of experiments, I have found that the characteristics of the petroleum wax crystals differ with each solvent used, all other factors remaining the same in each case. I have further found that, in all instances, larger crystals resulted when the super-saturated solvent was prevented from evaporating rapidly. I also found that where typical large flat crystal plates or tablets were formed in the initial stage of crystallization, these plates or tablets could be prevented from curling at the edges (and thus forming needles) by confining the supersaturated solution of wax between two plane surfaces separated by a gap of the order of magnitude of five to ten microns. Thus by confining the supersaturated wax solution in such a narrow space, the wax crystals are made to grow slowly due to the very slow rate of evaporation of the solvent, the crystals are allowed to grow freely, and without interference, as normal plates with their longer crystal axes parallel to the confining walls, and, due to the close proximity of the confining walls, are prevented from bending or rolling up on the edges to form "needles."

I have found that while temperature affects the rate of crystal growth and the characteristics of the crystals, most petroleum waxes will produce some normal plate-like crystals when the super-saturated solution is maintained at normal air temperatures, or within the range of 65° to 75° F., and that identical crystal characteristics can be obtained by repeating the experiments at temperatures within this range. I have found large differences in the rates of crystal growth of the different petroleum waxes, when solvent, temperature and other factors remain the same. Some petroleum waxes develop full-size crystals within a few minutes; others do not develop maximum crystal size for several hours or even several days.

The solvent which I have found best suited to the growing of maximum size plate-like wax crystals is C. P. toluene, although my method includes the use of any other suitable wax solvent, such as ether, carbon tetrachloride, ethyl alcohol, etc., it being understood that, for any one series of comparisons of different waxes, the same solvent must be used, and the conditions of temperature and manipulation must be uniformly the same throughout the series.

One of the advantages of my technique is that only a very minute sample of wax is required for the study and identification of the wax crystals. A wax sample weighing less than one milligram is ample for the purpose. For example, one tenth gram of cotton fiber yielded more than enough wax for a satisfactory determination of crystalline character. The fact that my method is applicable to very minute traces of wax extracted from a rock or soil sample is sufficient to illustrate the applicability of the method in soil prospecting for petroleum. In several instances I have been able to identify wax extracted from rock and soil samples as wax of petroleum origin, or as wax of non-petroleum origin.

Having developed the above described technique to the point where petroleum waxes could be made to develop permanent, non-deformed orthorhombic crystals of sufficient size for low power microscopic determination of optical or crystallographic characters, the further application of this technique to waxes from a sufficiently large number of different crude oils from different oil fields and different geological strata showed that each crude oil yielded a wax with slightly different crystalline habit or crystal characteristics, whereas each time the technique was applied to a different wax sample from the same crude oil, the resultant crystals were essentially identical and failed to show these slight differences in crystal character. These minor crystal characters, which were found sufficient to distinguish, in most instances, one parent crude oil from another, are too numerous to specify completely, but the following partial list will serve to illustrate what is meant.

1. Index of refraction, as indicated by high, medium, and low "relief" under microscope.

2. Average crystal size. Some petroleum waxes yield relatively large, others relatively small, crystals.

3. Crystal angles. Rhombic plates from petroleum waxes of different sources show differences in the average angles between the crystal faces.

4. Sharpness of angularity. Some petroleum waxes give crystals with sharp corners or angles made by intersecting crystal faces; in others, these edges or corners are invariably rounded.

5. Curved crystal faces. Some petroleum waxes invariably show crystals whose faces are curved, or otherwise irregular.

6. Twinning. Some petroleum waxes invariably yield crystals exhibiting some characteristic form of "twinning," whereas other petroleum waxes do not show any such habit or tendency.

The above examples are cited to illustrate the type of diagnosis achieved in the practice of my method, it being understood that with the knowledge that the above and many other such differences in the crystal character or habit can be used as a means of identifying the crude oil from which a wax sample was derived, the practical application to problems of geological exploration for petroleum is obviously a matter of applying the technique in any given region and making the necessary number of observations to establish the particular set of diagnostic wax crystal characters which may be found to apply to that particular region or area.

Having applied my technique to a sufficiently large number of waxes from different crude oils to establish which crystal characteristics all petroleum waxes have in common, the same technique was then applied to waxes other than those of petroleum origin. These latter included beeswax, waxes extracted from conifer trees, from cotton, from various other plants, and from soils in areas where petroleum deposits are known not to exist and where there was no possibility of soil contamination from any crude oil or refined petroleum products. Wherever any wax was recovered from these sources and treated according to the technique I have described, the microscopic characteristics of the crystallized wax proved quite distinct from those of any of the petroleum waxes examined. In all cases the non-petroleum waxes crystallized in needle-like form, with needles in most cases of much smaller size than those of petroleum waxes. In some instances the needles were so minute that magnifying powers of several hundred diameters could barely resolve the individual needle-like structures. In still other instances, there was doubt whether "needles" of submicroscopic size were present, or whether the waxy material was non-crystalline (amorphous). In some instances where "needles" or "laths" of non-petroleum wax were grown of sufficient size for successful application of petrographic examination, the crystals proved to belong to the monoclinic system, and others doubtfully to the triclinic system. In no instance were any plate-like rhombic crystals seen which could be identified as belonging to the orthorhombic system.

In the practice of my method of geochemical prospecting, soil samples are taken from holes drilled to a suitable and uniform depth over an area. It is usually preferable to take the samples at a depth of about four feet in order to exclude vegetable and animal matter and the derivatives thereof due to chemical or bacterial oxidation. The samples are then extracted with a solvent such as toluene and a supersaturated solution placed between parallel glass plates. The presence of orthorhombic crystals then gives conclusive evidence of the petroliferous origin of the extracted soil wax and of the presence of a deposit of oil or gas below the surface of the area from which the samples were obtained. Sample locations are spaced over the area as regularly as geographical and other conditions permit. Extraction of the samples and examination of the extract as described in this specification will then usually permit of drawing a line of demarkation on a map showing the location of the samples such that on the inside of a closed line will lie the locations from which soil wax of petroliferous origin was obtained, while outside of this line the samples either showed no wax at all or the presence of wax of vegetable or animal origin. The presence of oil or gas is then indicated at depth below the area in which the soil wax of petroleum origin was found.

It is often desirable to identify the geological formation from which a certain oil was produced or to ascertain whether a certain oil produced from a known stratum was originally present therein or migrated to it from another stratum. To obtain this desired information, it is sufficient, according to my invention, to ascertain the crystallographic structure of the wax contained in the oil produced, or extracted from a core or well cutting, and to compare it with the crystalline structure of the wax contained in oil taken from the stratum involved in a different well or in a different field. If the crystalline characteristics are identical, it may be stated with certainty that the same oil is involved.

The nature and objects of the present invention having been thus described, what is claimed as new and useful and is desired to be secured by Letters Patent is:

1. A method for determining if the wax in a wax-containing material is of petroleum origin which comprises extracting said material with a solvent for said wax, slowly evaporating the solvent from the extract to promote the growth of orthorhombic crystals and maintaining the crystals formed under conditions such as to preserve the plate-like structure, characteristic of wax of petroleum origin, of said crystals.

2. A method for determining if the wax contained in a wax-containing material is of petroleum origin which comprises extracting said material with a solvent for said wax and confining the extract between plates separated less than ten microns while maintaining a substantially constant temperature to promote the growth of orthorhombic crystals.

3. A method for determining if the wax in a wax-containing material is of petroleum origin which comprises extracting said material with toluene and confining the extract between flat surfaces separated less than ten microns while maintaining a substantially constant temperature to promote the growth of orthorhombic crystals.

BELA HUBBARD.